(12) United States Patent
Null

(10) Patent No.: US 7,485,353 B2
(45) Date of Patent: Feb. 3, 2009

(54) SILICON RUBBER COMPRISING AN EXTENDER OIL AND PROCESS TO PREPARE SAID EXTENDER OIL

(75) Inventor: Volker Klaus Null, Hamburg (DE)

(73) Assignee: Shell Oil Company, Houston, TX (US)

( * ) Notice: Subject to any disclaimer, the term of this patent is extended or adjusted under 35 U.S.C. 154(b) by 433 days.

(21) Appl. No.: 10/521,633

(22) PCT Filed: Jul. 18, 2003

(86) PCT No.: PCT/EP03/07861

§ 371 (c)(1),
(2), (4) Date: Jan. 19, 2005

(87) PCT Pub. No.: WO2004/009738

PCT Pub. Date: Jan. 29, 2004

(65) Prior Publication Data

US 2005/0258072 A1    Nov. 24, 2005

(30) Foreign Application Priority Data

Jul. 19, 2002    (EP) ................... 02016088

(51) Int. Cl.
*B65D 39/00*    (2006.01)
(52) U.S. Cl. .................... 428/36.9; 428/36.8
(58) Field of Classification Search ........... 208/58, 208/950, 19; 428/36.9, 36.8
See application file for complete search history.

(56) References Cited

U.S. PATENT DOCUMENTS

| | | | |
|---|---|---|---|
| 3,912,618 A | 10/1975 | Dryer | 208/87 |
| 4,202,812 A | 5/1980 | Murray | 260/37 SB |
| 4,943,672 A | 7/1990 | Hamner et al. | 585/737 |
| 5,059,299 A | 10/1991 | Cody et al. | 208/27 |

FOREIGN PATENT DOCUMENTS

| | | |
|---|---|---|
| AU | 698392 | 10/1998 |
| EP | 0 321 305 | 6/1989 |
| EP | 0 532 118 | 3/1993 |
| EP | 0 668 342 | 8/1995 |
| EP | 0 776 959 | 6/1997 |
| WO | 97/21788 | 6/1997 |
| WO | 99/20720 | 4/1999 |
| WO | 99/34917 | 7/1999 |
| WO | 00-14179 | 3/2000 |

OTHER PUBLICATIONS

International Search Report dated Sep. 22, 2003.

*Primary Examiner*—Tam M Nguyen

(57) ABSTRACT

A silicon rubber composition containing a hydrocarbon extender oil, wherein the oil is a Fischer-Tropsch derived oil. A process to prepare a silicon rubber extender oil having a CN number as measured according to IEC 590 of between 15 and 30%, a kinematic viscosity at 40° C. of between 5 an 18 $mm^2/sec$.

7 Claims, No Drawings

SILICON RUBBER COMPRISING AN EXTENDER OIL AND PROCESS TO PREPARE SAID EXTENDER OIL

The present application claims priority on European Patent Application 02016088.3 filed 19 Jul. 2002.

FIELD OF THE INVENTION

The invention is related to a silicon rubber composition comprising a hydrocarbon extender oil. The invention is also related to a process to make such an extender oil.

BACKGROUND OF THE INVENTION

Process oils are used in silicon rubber compositions as a cheap extender oils to reduce formulation costs. Key requirements for process oils for this application are full silicon oil compatibility but also good UV stability and low volatility. Widely available extender oils used for this purpose are naphthenic oils and hydroprocessed paraffinic petroleum oils. Hydroprocessed paraffinic petroleum oils are preferred for this use.

A disadvantage of the use of hydroprocessed paraffinic petroleum oils is that although some oils show excellent UV stability they show reduced silicon oil compatibility at higher oil contents.

It would be useful to provide a silicon rubber composition wherein the content of extender oil can be increased while properties such as UV stability and volatility are not worsened as compared to when a hydroprocessed paraffinic petroleum derived oil is used because of their low volatility and good UV stability.

The invention is directed to a silicon rubber composition comprising a hydrocarbon extender oil, wherein the oil is a Fischer-Tropsch derived oil.

The invention is also directed to a process for making an extender oil.

DETAILED DESCRIPTION OF THE INVENTION

Applicants found that when the Fischer-Tropsch derived oil is used an improved UV stability, and lower weight loss is observed as compared to when the hydroprocessed paraffinic petroleum oils are used. Furthermore the Fischer-Tropsch derived oil is found to be very compatible with the silicon rubber, even at high oil contents. The latter is very advantageous for economic reasons because the composition may comprise more of the Fischer-Tropsch derived oils. It is known that naphthenics oils have good compatibility with silicon rubber. It was thus a surprising finding that a Fischer-Tropsch derived oil, which is expected to contain high amounts of paraffins, shows such good silicon rubber compatibility.

The Fischer-Tropsch derived oil preferably has a kinematic viscosity at 40° C. of between 5 and 18 mm$^2$/sec, and more preferably below 12 mm$^2$/sec. The pour point of the oil is preferably below −20° C. and more preferably below −30°C. The sulfur content in the oil is preferably below 30 ppm and the nitrogen content is preferably below 100 ppm. Fischer-Tropsch derived oils will generally contain even lower levels of sulfur and nitrogen, preferably below 10 ppm ranges. Applicants further found that the Fischer-Tropsch derived oil preferably has a CN number as measured according to IEC 590 of between 15 and 30%.

Examples of processes which can for example be used to prepare the above-described Fischer-Tropsch derived oils, are described in EP-A-776959, EP-A-668342, U.S. Pat. No. 4,943,672, U.S. Pat. No. 5,059,299 and WO-A-9920720. The process will generally comprise a Fischer-Tropsch synthesis, a hydroisomerization step and an optional pour point reducing step, wherein said hydroisomerization step and optional pour point reducing step are performed as:

(a) hydrocracking/hydroisomerizing a Fischer-Tropsch product,
(b) separating the product of step (a) into at least one or more distillate fuel fractions and an extender oil fraction.

Optionally, the pour point of the extender oil is further reduced in a step (c) by means of solvent or preferably catalytic dewaxing of the oil obtained in step (b) to obtain oil having the preferred low pour point.

Examples of Fischer-Tropsch synthesis processes steps to prepare said Fischer-Tropsch product and hydroisomerization steps (a) are known from the so-called commercial Sasol process, the commercial Shell Middle Distillate Process or the non-commercial Exxon process.

In a preferred process to prepare the process oil having the desired CN-values (according to IEC 590), the Fischer-Tropsch derived feed or product used in step (a), has a weight ratio of compounds having at least 60 or more carbon atoms and compounds having at least 30 carbon atoms of at least 0.2 and wherein at least 30 wt % of compounds in the Fischer-Tropsch derived feed have at least 30 carbon atoms.

The relatively heavy Fischer-Tropsch derived feed as used in step (a) has at least 30 wt %, preferably at least 50 wt %, and more preferably at least 55 wt % of compounds having at least 30 carbon atoms. Furthermore the weight ratio of compounds having at least 60 or more carbon atoms and compounds having at least 30 carbon atoms of the Fischer-Tropsch derived feed is at least 0.2, preferably at least 0.4 and more preferably at least 0.55. The Fischer-Tropsch derived feed is preferably derived from a Fischer-Tropsch product which comprises a C$_{20}$+ fraction having an ASF-alpha value (Anderson-Schulz-Flory chain growth factor) of at least 0.925, preferably at least 0.935, more preferably at least 0.945, even more preferably at least 0.955.

The initial boiling point of the Fischer-Tropsch derived feed may range up to 400° C., but is preferably below 200° C. Preferably, compounds having 4 or less carbon atoms and compounds having a boiling point in that range are separated from a Fischer-Tropsch synthesis product before the Fischer-Tropsch synthesis product is used as a Fischer-Tropsch derived feed in step (a). The Fischer-Tropsch derived feed as described in detail above will for the greater part comprise a Fischer-Tropsch synthesis product In addition to this Fischer-Tropsch product also other fractions may also be part of the Fischer-Tropsch derived feed. Possible other fractions may suitably be any high boiling fraction obtained in step (b).

Such a Fischer-Tropsch derived feed is suitably obtained by a Fischer-Tropsch process which yields a relatively heavy Fischer-Tropsch product. Not all Fischer-Tropsch processes yield such a heavy product. An example of a suitable Fischer-Tropsch process is described in WO-A-9934917 and in AU-A-698392. These processes may yield a Fischer-Tropsch product as described above.

The hydrocracking/hydroisomerization reaction of step (a) is preferably performed in the presence of hydrogen and a catalyst, which catalyst can be chosen from those known to one skilled in the art as being suitable for this reaction. Catalysts for use in step (a) typically comprise an acidic functionality and a hydrogenation/dehydrogenation functionality. Preferred acidic functionalities are refractory metal oxide carriers. Suitable carrier materials include silica, alumina, silica-alumina, zirconia, titania and mixtures thereof. Preferred carrier materials for inclusion in the catalyst for use in the process of this invention are silica, alumina and silica-alumina. A particularly preferred catalyst comprises platinum supported on a silica-alumina carrier. If desired, the acidity of the catalyst carrier may be enhanced by applying a halogen moiety, in particular fluorine, or a phosphorous moiety to the carrier. Examples of suitable hydrocracking/hydroisomerisation processes and suitable catalysts are described in WO-A-0014179, EP-A-532118 and the earlier referred to EP-A-776959.

Preferred hydrogenation/dehydrogenation functionalities are Group VIII metals, such as nickel, cobalt, iron, palladium and platinum. Preferred are the noble metal Group VIII members, palladium and more preferred platinum. The catalyst may comprise the more preferred noble metal hydrogenation/dehydrogenation active component in an amount of from 0.005 to 5 parts by weight, preferably from 0.02 to 2 parts by weight, per 100 parts by weight of carrier material. A particularly preferred catalyst for use in the hydroconversion stage comprises platinum in an amount in the range of from 0.05 to 2 parts by weight, more preferably from 0.1 to 1 parts by weight, per 100 parts by weight of carrier material. The catalyst may also comprise a binder to enhance the strength of the catalyst. The binder can be non-acidic. Examples are clays and other binders known to one skilled in the art.

In step (a) the feed is contacted with hydrogen in the presence of the catalyst at elevated temperature and pressure. The temperatures typically will be in the range of from 175° C. to 380° C., preferably higher than 250° C. and more preferably from 300 to 370° C. The pressure will typically be in the range of from 10 bar to 250 bar and preferably between 20 bar and 80 bar. Hydrogen may be supplied at a gas hourly space velocity of from 100 to 10000 Nl/l/hr, preferably from 500 to 5000 Nl/l/hr. The hydrocarbon feed may be provided at a weight hourly space velocity of from 0.1 to 5 kg/l/hr. preferably higher than 0.5 kg/l/hr and more preferably lower than 2 kg/l/hr. The ratio of hydrogen to hydrocarbon feed may range from 100 to 5000 Nl/kg and is preferably from 250 to 2500 Nl/kg.

The conversion in step (a) as defined as the weight percentage of the feed boiling above 370° C. which reacts per pass to a fraction boiling below 370° C., is at least 20 wt %, preferably at least 25 wt %, but preferably not more than 80 wt %, more preferably not more than 65 wt %. The feed as used above in the definition is the total hydrocarbon feed fed to step (a), thus may also include any optional recycle of a high boiling fraction which may be obtained in step (b).

In step (b) the product of step (a) is preferably separated into one or more distillate fuels fractions and an extender oil (precursor) fraction having the desired viscosity properties. In a preferred embodiment the pour point of the extender oil is further reduced by means of a catalytic dewaxing step (c). In such an embodiment it may be a further advantage to dewax a wider boiling fraction of the product of step (a). From the resulting dewaxed product the extender oil and oils having a higher viscosity can then be advantageously isolated by means of distillation. The final boiling point of the feed to the dewaxing step (c) may be up to the final boiling point of the product of step (a).

The silicon rubber component may be a state of the art silicon rubber as described in Rubber Technology Handbook, Werner Hofmann, Oxford University Press, New York, 1980, paragraph 3.4.1. Silicon rubbers have a main polymer chain which mainly consist of silicon and oxygen atoms. On the silicon atoms in the chain hydrocarbon groups, for example, methyl, ethyl or phenyl, may be present. Small amounts of termonomer with vinyl groups may also be present in the rubber. In addition to the silicon rubber and the extender oils, vulcanizing agents, fillers, stabilizers and softeners may also be present in the silicon rubber composition.

The silicon rubber content will be between 90 and 60 wt %. The extender oil content will preferably be between 10 and 40 wt % and more preferably between 20 and 40 wt % and most preferably above 30 wt %.

The invention will be illustrated by making use of the following non-limiting examples.

TABLE 1

| Oils tested | Method | Unit | Fischer-Tropsch derived oil | Total Hydroseal G 400 H |
|---|---|---|---|---|
| DENSITY at 15° C. | DIN 51757 | kg/m$^3$ | 803.4 | 812.4 |
| REFRACTIVE INDEX at 20° C. | DIN 51423-2 |  | 1.4468 | 1.4472 |
| POUR POINT | DIN ISO 3016 | ° C. | <−63 | −45 |
| KIN. VISCOSITY 40° C. | DIN 51562 | mm2/s | 6.8 | 6.0 |
| CN number | IEC 590 | % | 24.9 | Not measured |

EXAMPLE 1

30 PHR of a Fischer-Tropsch derived oil having the properties as listed in Table 1 was thoroughly mixed for 10 minutes by means of a turbo mixer (approx. 1500 rpm) with 70 PHR of a silicon rubber (Wacker Silicon rubber NG 200-120000) and 5 PHR of a coupling agent and catalyst (Wacker coupling agent ES 24)

Oil Compatibility 20 g of the mixture as obtained above was placed on an OHP slide, spread with a spatula to give a layer with 1-3 mm thickness. The surface was evaluated after 3 days of connecting up at room temperature (20° C.). The surface was observed to be smooth and dry without any observation of oil drops.

Weight Loss

Approximately 25 g of the freshly prepared oil-silicon mixture as obtained after turbo mixing was weighed in an Aluminium pan to the nearest 0.1 mg (Aluminium pan with 28 ml volume, lower diameter 51 mm, upper diameter 64 mm). The weight loss was determined from two samples after 21 days, first 7 days storage at room temperature (20° C.) followed by 14 days at 70° C. The results are summarized in Table 2.

UV Stability of the Oil

The Fischer-Tropsch derived oil was also evaluated in a UV light box and monitored daily. It was found that the oil sample remained clear (by visional observation) for at least 264 hours.

EXAMPLE 2

Example 1 was repeated except that 32.5 PHR of Fischer-Tropsch derived oil was used. The weight percentage of coupling agent was the same as in, Example 1.

Oil Compatibility

The surface was observed to be smooth and dry without any observation of oil drops.

EXAMPLE 3

Example 1 was repeated except that 35 PHR of Fischer-Tropsch derived oil was used. The weight percentage of coupling agent was the same as in Example 1. The results are presented in Table 2. The surface was observed to be smooth and dry without any observation of oil drops.

Comparative Experiment A

Example 1 was repeated except that a Total Hydroseal G 400 H oil was used as extender oil. The properties of this oil are also listed in Table 1. The surface was observed to be smooth and dry without any observation of oil drops.

Weight Loss

The weight loss results as determined after the full 21 days, are summarized in Table 2.

UV Stability of the Oil

The Hydroseal G 400 H oil was also evaluated in a UV light box and monitored daily. It was found that the oil sample remained clear (by visional observation) for 168 hours. After 192 hours a haze was observed.

Comparative Experiment B

Example 2 was repeated except that Total Hydroseal G 400 H oil was used as extender oil. The surface was observed to separate oil drops resulting from oil leaking from the oil extended silicon rubber.

The composition was not stable and the oil was not compatible with the silicon rubber at the oil content as tested.

Comparative Experiment C

Example 3 was repeated except that a Total Hydroseal G 400 H oil was used as extender oil. The surface was observed to separate oil drops resulting from oil leaking from the oil extended silicon rubber.

The composition was not stable and the oil was not compatible with the silicon rubber at the oil content as tested.

TABLE 2

| Weight loss results | | Fischer-Tropsch derived oil | Total Hydroseal G 400 H |
|---|---|---|---|
| 30% Oil in Silicon Rubber | wt % | 8.7 (Example 1) | 15 (Experiment A) |
| 32.5% Oil in Silicon Rubber | wt % | 7.4 (Example 2) | * |
| 35% Oil in Silicon Rubber | wt % | 9.1 (Example 3) | * |

* the weight loss was not determined because no stable polymer was obtained at these high oil contents.

I claim:

1. A silicon rubber composition comprising a hydrocarbon extender oil, wherein the oil is a Fischer-Tropsch derived oil and wherein the oil content in the composition is between 20 and 40 wt % based on the weight of rubber and oil.

2. The silicon rubber of claim 1, wherein the kinematic viscosity at 40° C. of the oil is between 5 and 18 mm$^2$/sec.

3. The silicon rubber of claim 2, wherein the kinematic viscosity at 40° C. of the oil is between 5 and 12 mm$^2$/sec.

4. The silicon rubber of claim 1, wherein the pour point of the oil is below −20° C.

5. The silicon rubber of claim 1, wherein the CN number of the oil as measured according to IEC 590 is between 15 and 30%.

6. The silicon rubber of claim 1, wherein the oil is obtained by a process comprising:
   (a) hydrocracking/hydroisomerizing a Fischer-Tropsch product; and,
   (b) separating the product of step (a) into at least one or more fuel fractions and an extender oil fraction.

7. The silicon rubber of claim 6, wherein the extender oil has also been subjected to a catalytic dewaxing treatment.

* * * * *